US011210327B2

(12) United States Patent
Gulwani et al.

(10) Patent No.: US 11,210,327 B2
(45) Date of Patent: *Dec. 28, 2021

(54) SYNTACTIC PROFILING OF ALPHANUMERIC STRINGS

(71) Applicant: Microsoft Technology Licensing, LLC, Redmond, WA (US)

(72) Inventors: Sumit Gulwani, Sammamish, WA (US); Prateek Jain, Karnataka (IN); Daniel Adam Perelman, Seattle, WA (US); Saswat Padhi, Los Angeles, CA (US); Oleksandr Polozov, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

This patent is subject to a terminal disclaimer.

(21) Appl. No.: 16/448,805

(22) Filed: Jun. 21, 2019

(65) Prior Publication Data

US 2019/0311004 A1    Oct. 10, 2019

Related U.S. Application Data

(63) Continuation of application No. 15/663,575, filed on Jul. 28, 2017, now Pat. No. 10,394,874.

(51) Int. Cl.
 *G06F 16/35* (2019.01)
 *G06F 40/151* (2020.01)
 *G06F 40/211* (2020.01)

(52) U.S. Cl.
 CPC .......... *G06F 16/355* (2019.01); *G06F 40/151* (2020.01); *G06F 40/211* (2020.01)

(58) Field of Classification Search
 CPC ..... G06F 16/355; G06F 40/151; G06F 40/211
 USPC ........................................................ 707/739
 See application file for complete search history.

(56) References Cited

U.S. PATENT DOCUMENTS

| 8,799,234 B2* | 8/2014 | Gulwani | G06F 40/16 |
| | | | 707/687 |
| 10,650,000 B2* | 5/2020 | Oberbreckling | G06F 16/221 |
| 2016/0294852 A1* | 10/2016 | Hagen | H04L 61/301 |

* cited by examiner

*Primary Examiner* — Robert Stevens
(74) *Attorney, Agent, or Firm* — Alleman Hall Creasman & Tuttle LLP

(57) ABSTRACT

A computing device includes a storage machine holding instructions executable by a logic machine to generate multi-string clusters, each containing alphanumeric strings of a dataset. Further multi-string clusters are generated via iterative performance of a combination operation in which a hierarchically-superior cluster is generated from a set of multi-string clusters. The combination operation includes, for candidate pairs of multi-string clusters, generating syntactic profiles describing an alphanumeric string from each multi-string cluster of the candidate pair. For each of the candidate pairs, a cost factor is determined for at least one of its syntactic profiles. Based on the cost factors determined for the syntactic profiles, one of the candidate pairs is selected. The multi-string clusters from the selected candidate pair are combined to generate the hierarchically-superior cluster including all of the alphanumeric strings from the selected candidate pair of multi-string clusters.

20 Claims, 11 Drawing Sheets

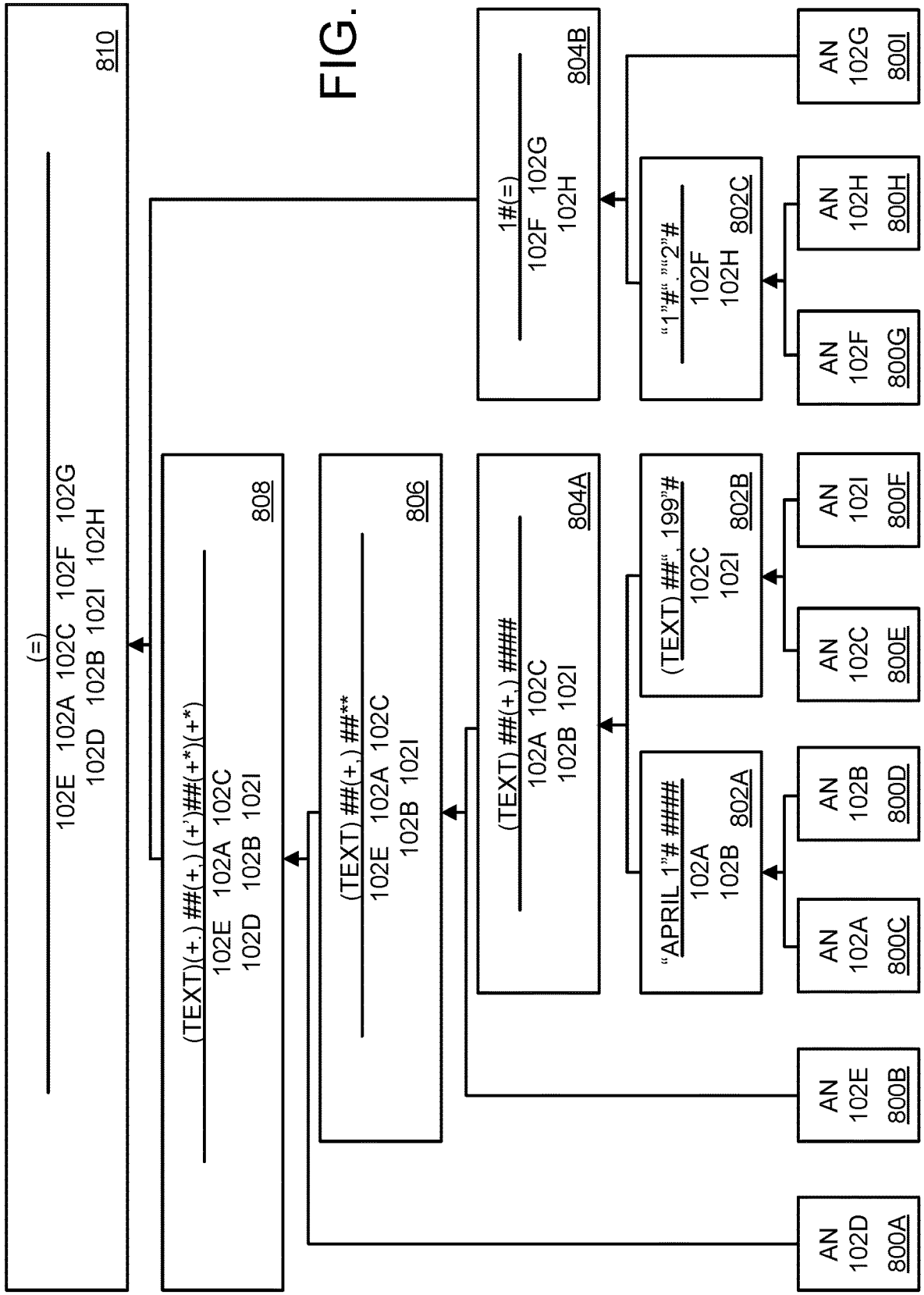

SYNTACTIC PROFILING OF ALPHANUMERIC STRINGS

CROSS REFERENCE TO RELATED APPLICATIONS

This application is a continuation of U.S. patent application Ser. No. 15/663,575, filed Jul. 28, 2017, the entire contents of which is hereby incorporated herein by reference for all purposes.

BACKGROUND

Large numbers of alphanumeric strings containing letters, numbers, and other characters can be held in computer-maintained datasets. Alphanumeric strings within the datasets can be combined, manipulated, and/or otherwise transformed in a variety of ways. Such data transformation can be performed more effectively and reliably when all of the alphanumeric strings to be transformed have the same written format, or fit the same profile.

BRIEF DESCRIPTION OF THE DRAWINGS

FIG. 8 schematically illustrates iterative combination of clusters to form a hierarchically-paramount cluster.

DETAILED DESCRIPTION

As indicated above, computer-maintained datasets can include vast numbers of individual alphanumeric strings, potentially numbering in the thousands, millions, or more. As an example, such strings may be held in computer-maintained spreadsheets or databases in which they are divided into distinct rows and columns, though other suitable organizational paradigms may also be used. In such datasets, it is often the case that not all alphanumeric strings of the same category—or that convey the same information—use the same format. As a basic example, calendar dates can be represented using a wide variety of formats, including "MM-DD-YYYY," "DD-MM-YYYY," "MM/ DD/YYYY," etc., and any or all of such formats may be present in the dataset. A common goal when working with such datasets is to transform alphanumeric strings to all have the same format (e.g., all strings describing calendar dates use the format "MM-DD-YYYY"). However, this can be prohibitively tedious and time-consuming to perform by hand even for small datasets with only a few dozen or hundred alphanumeric strings. Skilled users can attempt to use automated solutions for string transformation, though this generally requires at least some knowledge of which formats are present in the dataset, and this can be difficult to determine manually.

Accordingly, the present disclosure is directed to a technique for profiling of alphanumeric strings in a computer-maintained dataset. This technique can be used by a computing system to generate a variety of syntactic profiles, each syntactic profile describing a format of one or more alphanumeric strings in the dataset. String profiling as described herein includes assigning alphanumeric strings to clusters, where each of the strings in a given cluster is described by the same syntactic profile, which can be referred to as a cluster-defining syntactic profile. Clusters can be combined to form larger clusters described by more general syntactic profiles, which over several iterations creates a hierarchy of clusters, and therefore a hierarchy of syntactic profiles describing alphanumeric strings held in the clusters. Some or all of the generated syntactic profiles can then be presented to a user, providing the user with valuable information as to the different formats present in the dataset, which can, among other benefits, facilitate more efficient transformation of alphanumeric strings.

Figure 1:
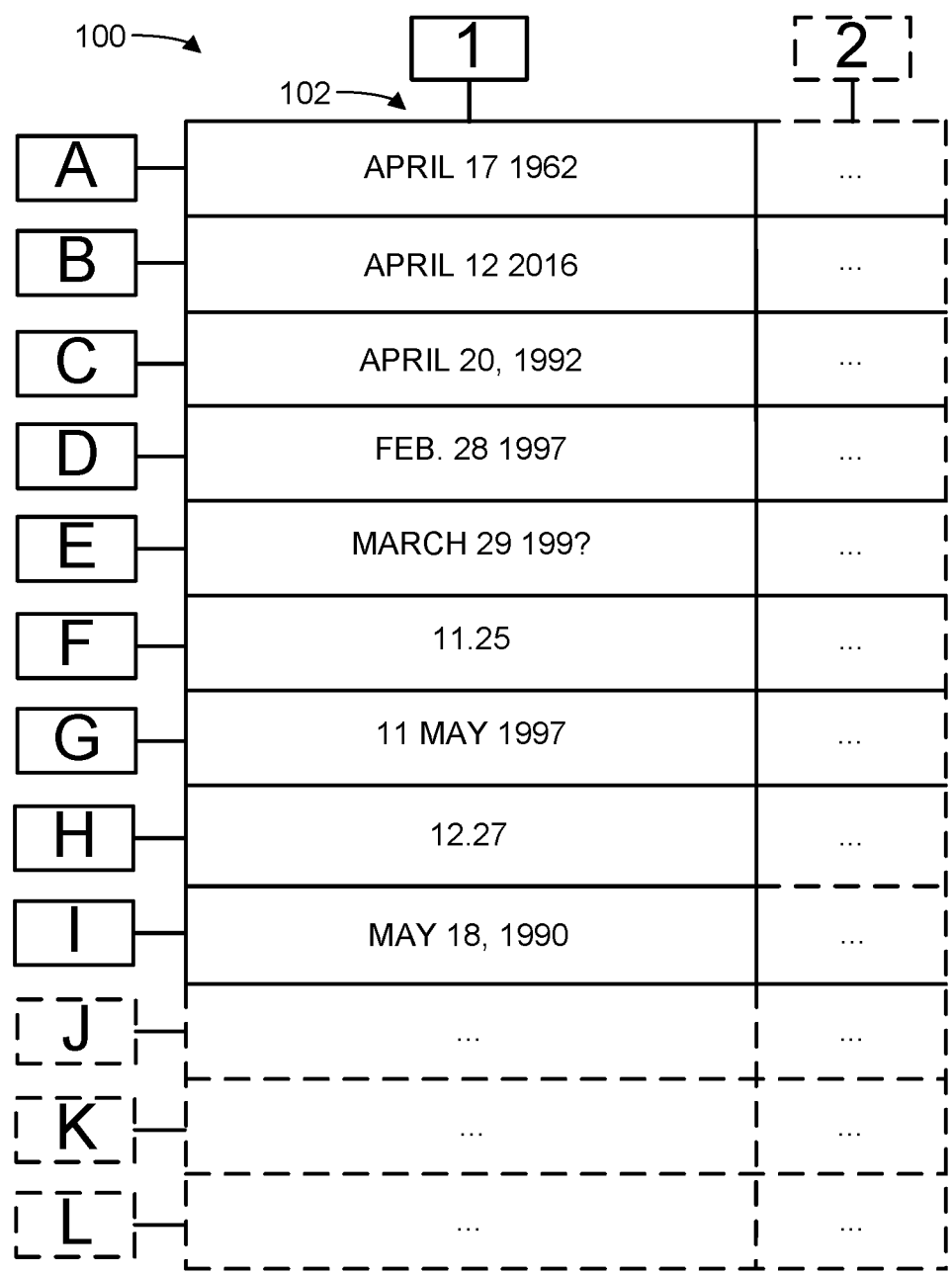
FIG. 1 shows a portion of an example dataset including several alphanumeric strings.

FIG. 1 schematically shows an example of a dataset 100 holding a number of alphanumeric strings 102. It will be appreciated that datasets as described herein may include data held on one or more storage machines of one or more computing systems, and presented via any of a variety of suitable displays. A computing system used to manage a dataset and/or profile strings may have a variety of form factors, including a desktop computer, laptop computer, server, tablet computer, smartphone, wearable device, etc. Further, the dataset manipulation and example management techniques described herein may be distributed across multiple computers. For example, a computer that stores a dataset may be different from a computer that profiles strings in the dataset. A computing system that stores a dataset and/or performs alphanumeric string profiling as described herein may be implemented as computing system 1000, described below with respect to FIG. 10.

Further, the appearance of dataset 100, as well as other datasets described below, is not intended to limit the present disclosure. It will be appreciated that any visual elements or user-interface elements described herein or illustrated in the figures are examples, and are only intended to serve as visual aids. Datasets, strings, syntactic profiles, clusters, etc., as described herein may have any suitable appearance, and may be interacted with by a user in a variety of ways. Further, dataset 100 shows alphanumeric strings 102 organized in several rows/columns, though it will be understood that datasets may include any suitable number of such rows/columns, or use organization schemes that differ from the row/column paradigm.

Because the set of strings 102 shown in FIG. 1 are all held in a single column, strings held in dataset 100 are referred to herein according to the labels appended to each row of dataset 100. For example, the string "Apr. 17, 1962" is referred to as 102A, given its position in row A. Similarly, the string "12.27" is referred to as 102H, given its position in row H.

As indicated above, alphanumeric strings in a dataset, particularly large datasets, often use different formats to describe similar information. As an example, the date "Mar. 26, 1992" could be written as "3-26-92," "26 Mar. 1992," "Mar. 26, '92," etc., and any or all of these different formats may be present in the dataset. This is the case in dataset 100, in which the illustrated alphanumeric strings exhibit a variety of different formats. Using strings 102A and 102C as an example, string 102C incorporates a comma, while string 102A does not. While this is easy to identify in the small number of alphanumeric strings shown in dataset 100, it can be prohibitively difficult, even impossible absent extremely high-powered computing resources, to efficiently notice format correspondence in datasets with thousands, millions, or even greater numbers of strings. Still further, pattern recognition with even small numbers of strings can be very difficult given the tens, hundreds, even thousands of potential patterns at higher and lower levels of generality/specificity. And still further, common solutions a user may turn to for string transformation may behave improperly when encountering unexpected string formats, for example by skipping over strings having the unexpected formats, outputting errors, generating an incorrect transformation, etc.

Figure 2:
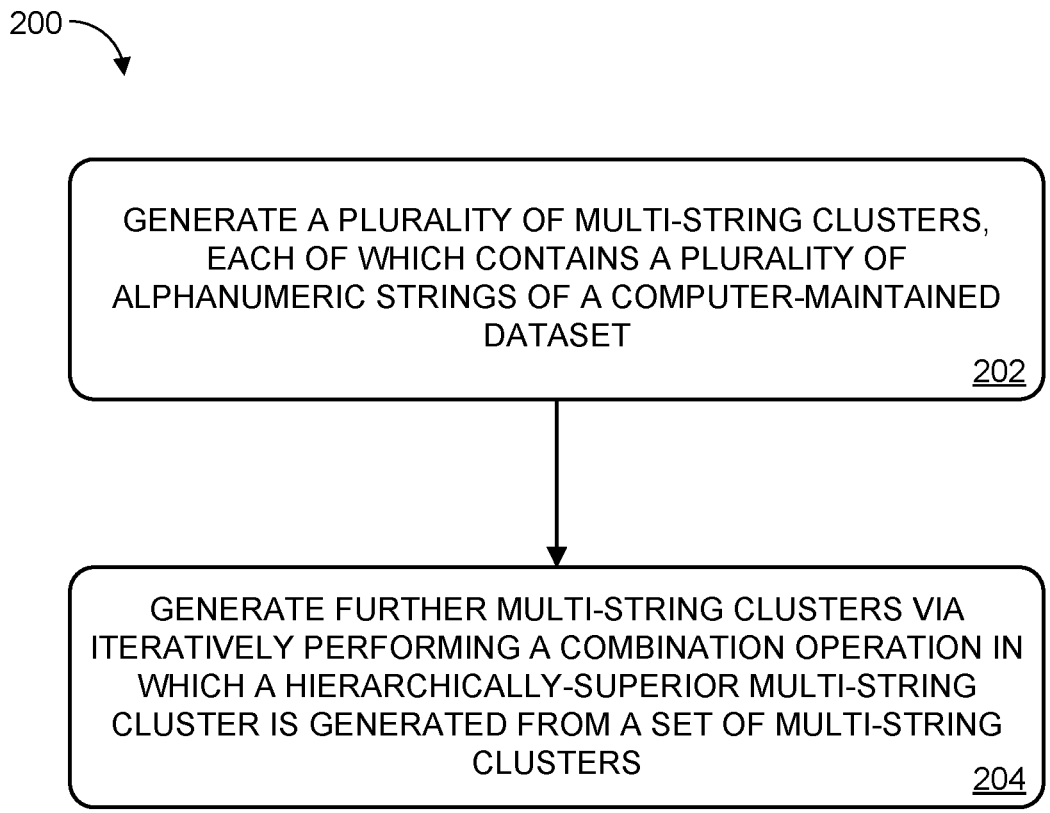
FIG. 2 illustrates an example method for syntactic profiling of alphanumeric strings.
Figure 3:
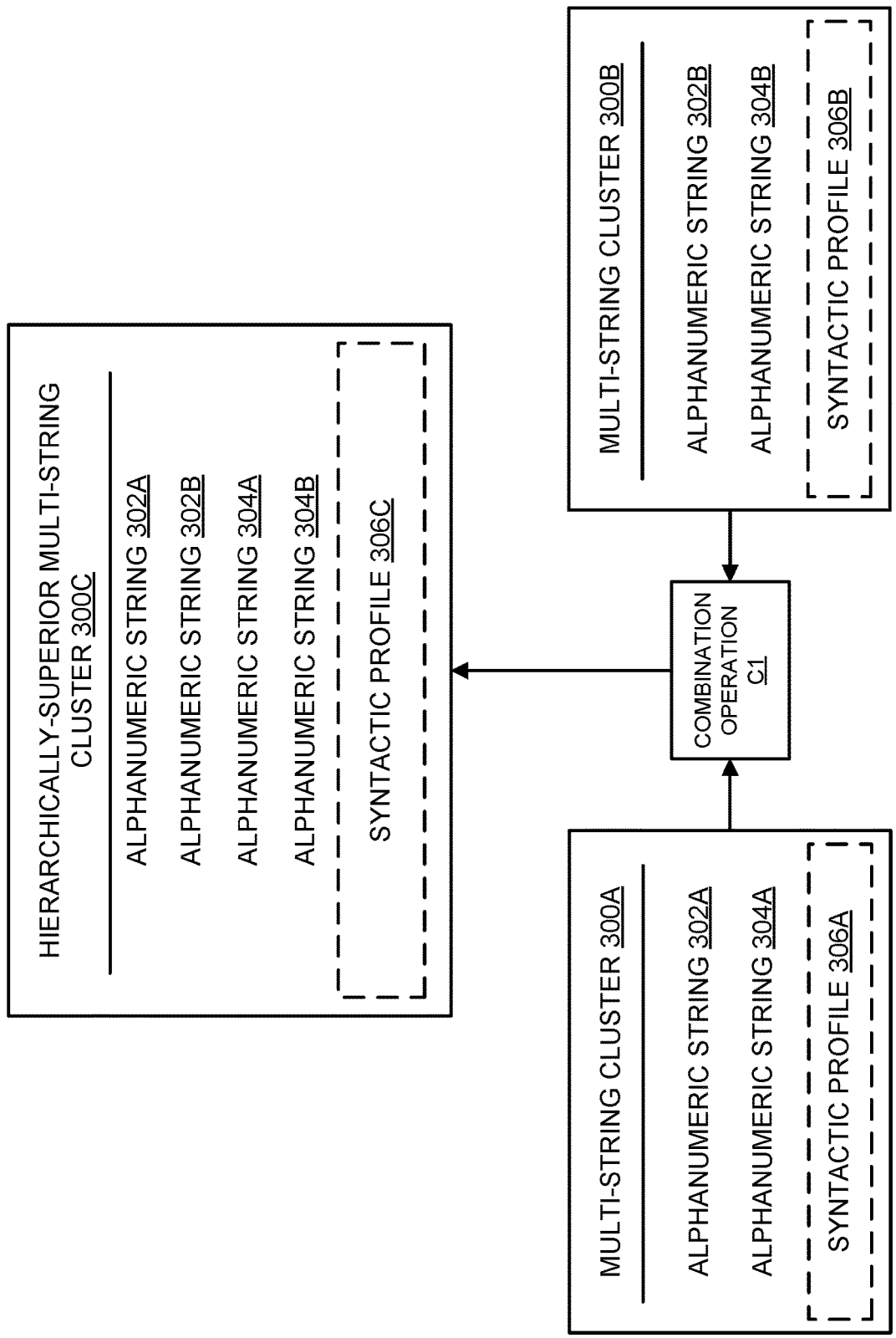
FIG. 3 schematically illustrates combining of multi-string clusters to generate a hierarchically-superior multi-string cluster.

Accordingly, FIG. 2 illustrates an example method 200 for syntactic profiling of alphanumeric strings. At 202, method 200 includes generating a plurality of multi-string clusters, each of which contains a plurality of alphanumeric strings of a computer-maintained dataset. Examples of multi-string clusters are shown in FIG. 3, which schematically shows multi-string clusters 300A and 300B. Multi-string cluster 300A includes two alphanumeric strings 302A and 304A, while multi-string cluster 300B includes alphanumeric strings 302B and 304B. Multi-string clusters may be generated in a variety of suitable ways.

In some examples, multi-string clusters may be generated by performing a combination operation to iteratively combine a plurality of single-string clusters. For example, starting with a dataset containing alphanumeric strings, each of the strings in the dataset may be assigned to a different single-string cluster. In other examples, initial clustering may be done using only a subset of the overall dataset, as will be described in more detail below. Once each of the sampled strings are assigned to single-string clusters, the single-string clusters may be combined into multi-string clusters, which may be combined further into hierarchically-superior multi-string clusters, as will be described in more detail below.

In some examples, and as will be described in further detail below, all of the alphanumeric strings contained in each generated cluster are described by a same syntactic profile. In the case of FIG. 3, strings in multi-string cluster 300A are described by syntactic profile 306A, while strings in multi-string cluster 300B are described by syntactic profile 306B. Returning to the example of calendar dates from above, a simplified profile may describe alphanumeric strings having the format "MM-DD-YYYY," while another simplified profile may describe strings having the format "MM/DD/YYYY." Strings described by the same syntactic profile may be grouped into the same cluster, such as multi-string clusters 300A and 300B.

In some cases, the plurality of multi-string clusters need not be computed from every alphanumeric string from the original dataset. Rather, the multi-string clusters may instead be computed from a subset of the alphanumeric strings from the dataset (e.g., 50 strings selected from a dataset of 10,000 strings). This subset may be sampled from the dataset in any suitable way. In some cases, the subset of alphanumeric strings may be sampled randomly from the dataset. In other cases, the subset may include, for example, the first 50 strings of the dataset. In some implementations, more sophisticated sampling approaches may be used, so as to increase the chance that the selected sample more completely reflects the diversity of formats present in the dataset.

Returning briefly to FIG. 2, at 204, method 200 includes generating further multi-string clusters via iteratively performing a combination operation in which a hierarchically-superior multi-string cluster is generated from a set of multi-string clusters. This is also illustrated in FIG. 3, in which multi-string clusters 300A and 300B are combined via a combination operation C1. Combination operation C1 will be described in more detail below with respect to FIG. 4.

The combination of multi-string clusters 300A and 300B results in a new, hierarchically-superior multi-string cluster 300C, including all of alphanumeric strings 302A, 302B, 304A, and 304B. All of the strings in hierarchically-superior multi-string cluster 300C are described by a new syntactic profile 306C, which may be more general than either of syntactic profiles 306A and 306B (i.e., to capture a wider range of possible string formats). The term "hierarchically-superior" is used herein to refer to any cluster that is higher than other clusters in an overall hierarchy of clusters, where clusters that describe a superset of the strings described by a particular cluster are higher in the hierarchy than the particular cluster. It will be understood that hierarchically-superior clusters may include any number of strings greater than 1, and can be generated from any number of hierarchically-inferior strings. As examples, hierarchically-superior multi-string clusters may be generated from multiple multi-string clusters, multiple single-string clusters, a mix of single and multi-string clusters, etc.

Figure 4:
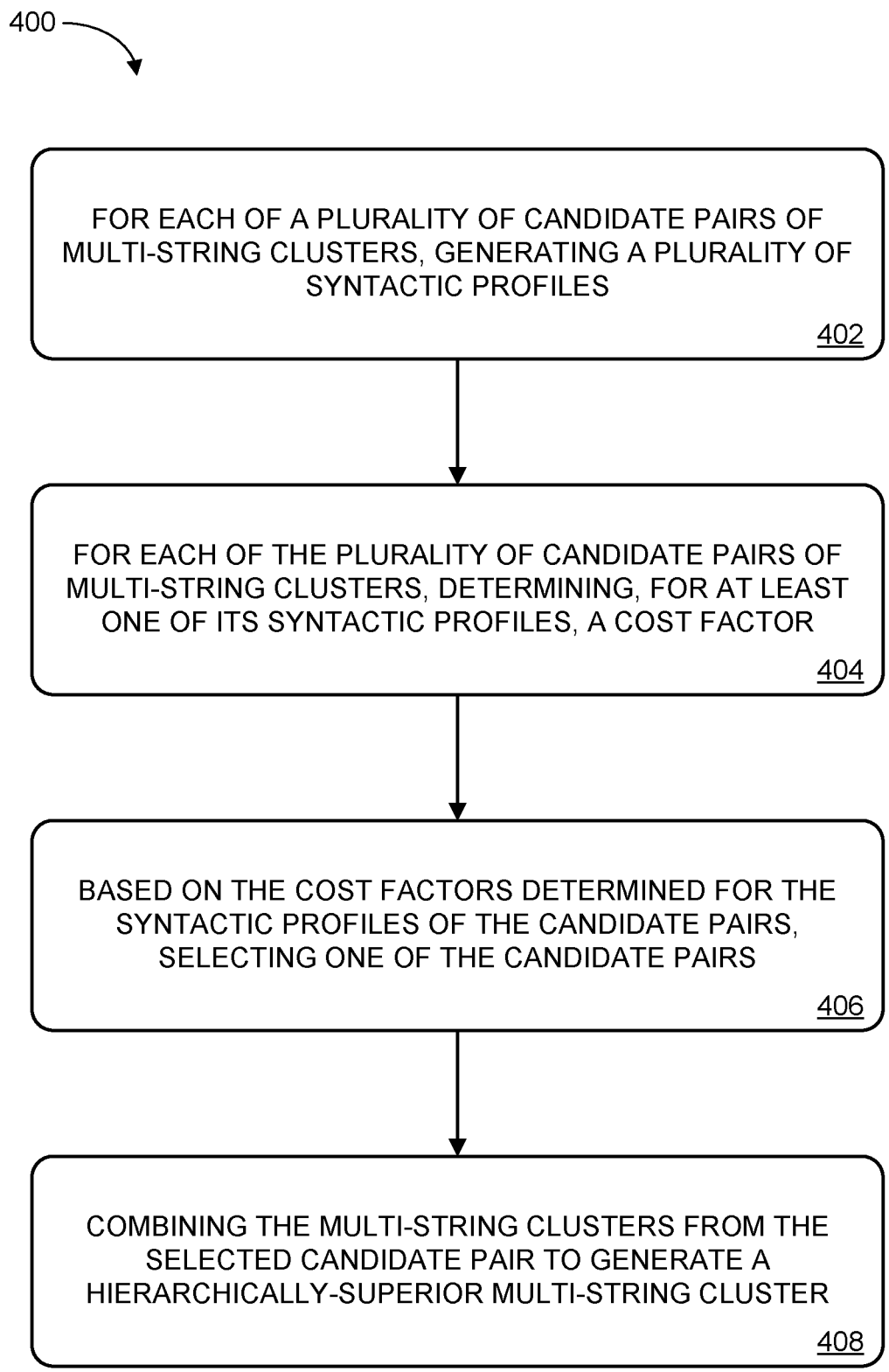
FIG. 4 illustrates a flowchart for a combination operation used to combine clusters.
Figure 5:
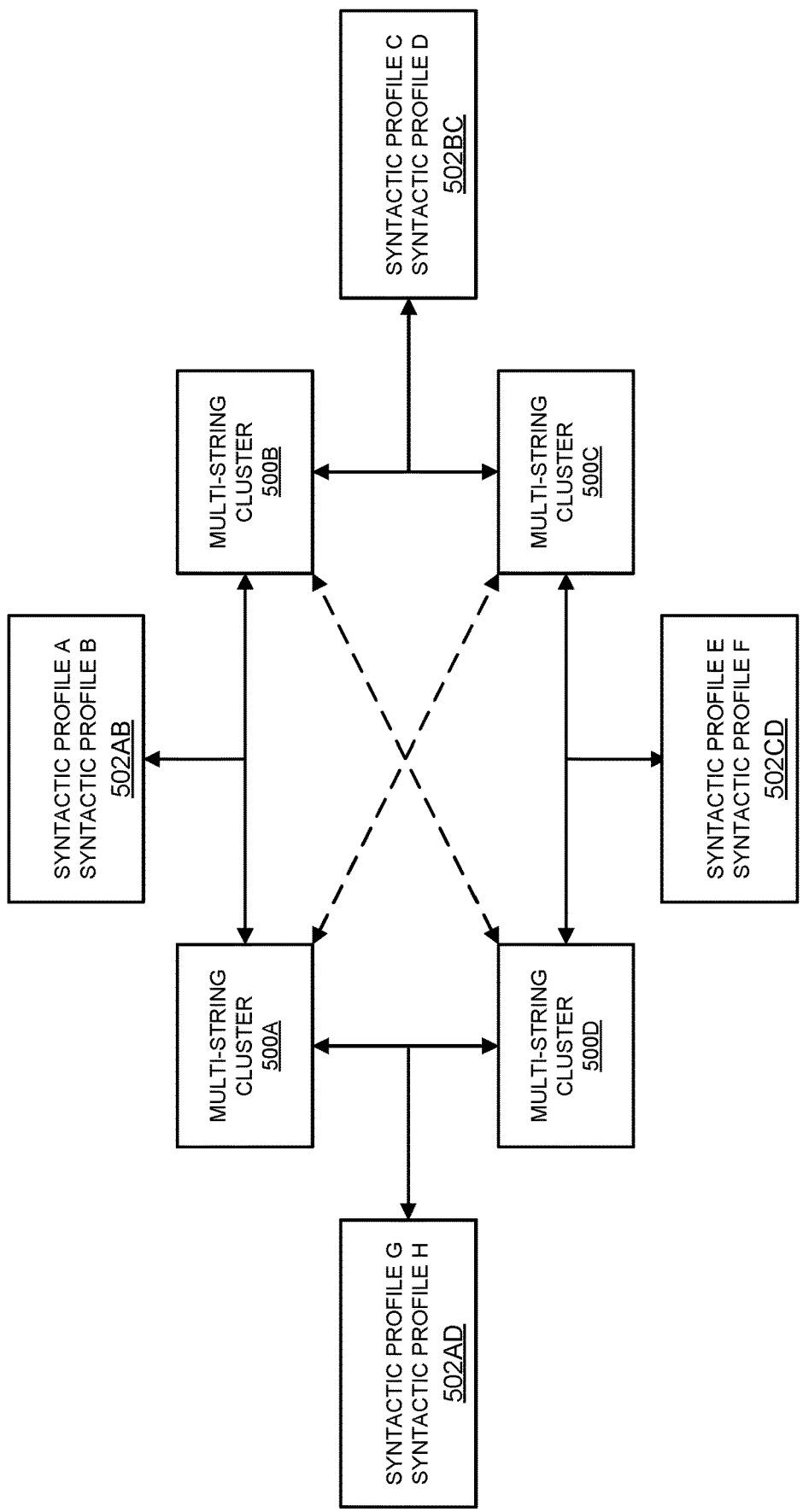
FIG. 5 schematically illustrates generation of a plurality of syntactic profiles for each of a set of candidate pairs of multi-string clusters.

Combination operation C1 will now be described with respect to FIG. 4. FIG. 4 illustrates an example method 400 for a combination operation used to combine clusters. At 402, method 400 includes, for each of a plurality of candidate pairs of multi-string clusters, generating a plurality of syntactic profiles. This is schematically illustrated in FIG. 5, showing a plurality of multi-string clusters 500A, 500B, 500C, and 500D. The plurality of multi-string clusters may be generated in any suitable way, and may in some examples be generated through iterative combination of single-string clusters, as indicated above.

For each of the possible candidate pairs of multi-string clusters in FIG. 5, a different set of syntactic profiles 502 is generated, so as to determine which pair of multi-string clusters would be best suited for combination. In FIG. 5, set of syntactic profiles 502AB includes syntactic profile A and syntactic profile B, generated for the candidate pair of multi-string cluster 500A and multi-string cluster 500B. Similarly, set of syntactic profiles 502BC is generated for the candidate pair of multi-string clusters 500B and 500C, set of syntactic profiles 502CD is generated for the candidate pair of multi-string clusters 500C and 500D, and set of syntactic profiles 502AD is generated for the candidate pair of multi-string clusters 500A and 500D. It will be understood that additional sets of syntactic profiles may be generated for the candidate pair of multi-string clusters 500A and 500C, as well as the candidate pair of multi-string clusters 500B and 500D, indicated in FIG. 5 by dashed arrows.

Each generated syntactic profile may describe one or more of the alphanumeric strings held in a union of the two clusters of the candidate pair of multi-string clusters. In other words, syntactic profiles A and B may each describe an alphanumeric string from one multi-string cluster of the candidate pair (e.g., multi-string cluster 500A), and an alphanumeric string from the other multi-string cluster of the candidate pair (e.g., multi-string cluster 500B). In some cases, each syntactic profile generated for a particular candidate pair may describe every alphanumeric string held in the multi-string clusters of the candidate pair.

Figure 6:
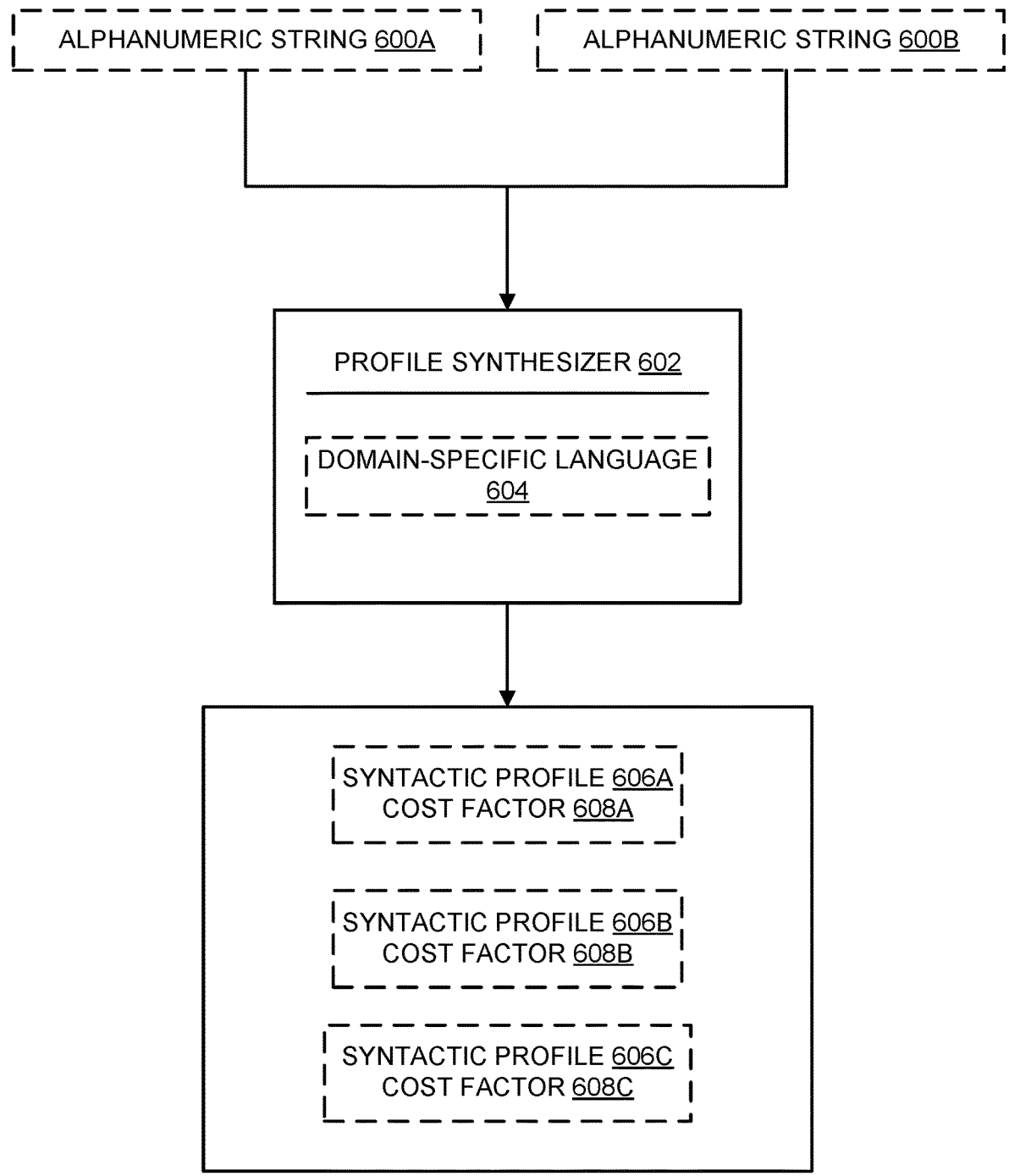
FIG. 6 schematically illustrates generation of a plurality of syntactic profiles for two alphanumeric strings.

Syntactic profiles for each candidate pair of multi-string clusters may be generated in any suitable way. In some cases, this may involve selecting one or more strings from each multi-string cluster, and providing them to a profile sequencer configured to identify syntactic profiles that describe the provided strings. This is illustrated in FIG. 6, which schematically shows two example alphanumeric strings 600A and 600B being provided to a profile sequencer 602. Alphanumeric strings 600A and 600B may be, for example, selected from two different string clusters (e.g., single-string or multi-string clusters). In some cases, the profile sequencer may first be parameterized with a domain-specific language (DSL) that defines the profile space to be searched while generating syntactic profiles. This may, for example, prime the profile sequencer to search for specific meaningful patterns and relationships in the input strings, while ignoring other patterns or relationships that do not make sense in the context of the dataset.

It will be understood that a variety of different profile sequencers or similar technologies may be used to generate syntactic profiles that describe alphanumeric strings. Further, such profile sequencers may be used to find syntactic profiles matching any suitable number of input strings, though typically such profile sequencers are used for 1, 2, or 3 alphanumeric strings at once. As a non-limiting example, the profile sequencer may be implemented as the Program Synthesis by Example (PROSE) library developed by Microsoft® Corporation. Such sequencers may generally be configured to, for a given set of input strings, output one or more syntactic profiles that describe the set of input strings. In other words, generation of syntactic profiles may include providing two or more alphanumeric strings to the profile sequencer, and receiving from the profile sequencer a plurality of profiles describing the two or more alphanumeric strings. In FIG. 6, profile sequencer 602 generates three syntactic profiles 606A, 606B, and 606C for the two alphanumeric strings 600A and 600B.

In general, syntactic profiles take the form of computer-readable descriptions of a particular pattern or format that describes one or more alphanumeric strings in a dataset. Such profiles can have any suitable degree of specificity, and the profile sequencer will often output multiple different syntactic profiles, with at least some having different degrees of specificity. As an example, the string "12345" may be described by a profile represented as "1234#," where the "#" symbol indicates presence of any number. Accordingly, this syntactic profile would also describe the strings "12344," "12346," etc. The string "12345" could also be described by the less specific profiles "123##," "12##5," etc. However, it will be understood that syntactic profiles may take any suitable form, and use any suitable notation. Further, in some examples, syntactic profiles may be assigned human-readable names or labels.

In some cases, syntactic profiles may enable the computing system to perform certain actions, such as identifying any alphanumeric strings in the dataset that match the syntactic profile. Accordingly, syntactic profiles may be implemented as regular expressions, for example.

For each candidate pair of clusters, any suitable number of syntactic profiles may be generated. In some cases, a set of syntactic profiles may be generated for every possible combination of pairs of alphanumeric strings selected from the clusters of the candidate pair. To use the example of FIG. 3, this may include generating syntactic profiles for the pair of input strings 302A and 302B, 302A and 304B, 304A and 302B, and 304A and 304B. In other words, for each candidate pair of clusters, every possible pair of alphanumeric strings may be provided to the profile sequencer, such that for every pair of input strings, one string is selected from each of the clusters of the candidate pair. However, in other examples, syntactic profiles may be generated for fewer than all of the possible combinations of alphanumeric strings from the candidate pair of clusters, so as to conserve computing resources. For example, based on knowledge of profiles generated for some combinations of alphanumeric strings, the relative similarity/dissimilarity of other alphanumeric strings, and therefore their suitability for clustering, can be inferred without having to expend computational resources calculating additional syntactic profiles.

Returning briefly to FIG. 4, at 404, method 400 includes, for each of the plurality of candidate pairs of multi-string clusters, determining, for a least one of its syntactic profiles, a cost factor. As shown in FIG. 6, each of the generated syntactic profiles 606 has an associated cost factor 608. Cost factors can take any suitable form, though generally will serve as an indicator of how specific or general the cost factor's associated syntactic profile is.

Figure 7:
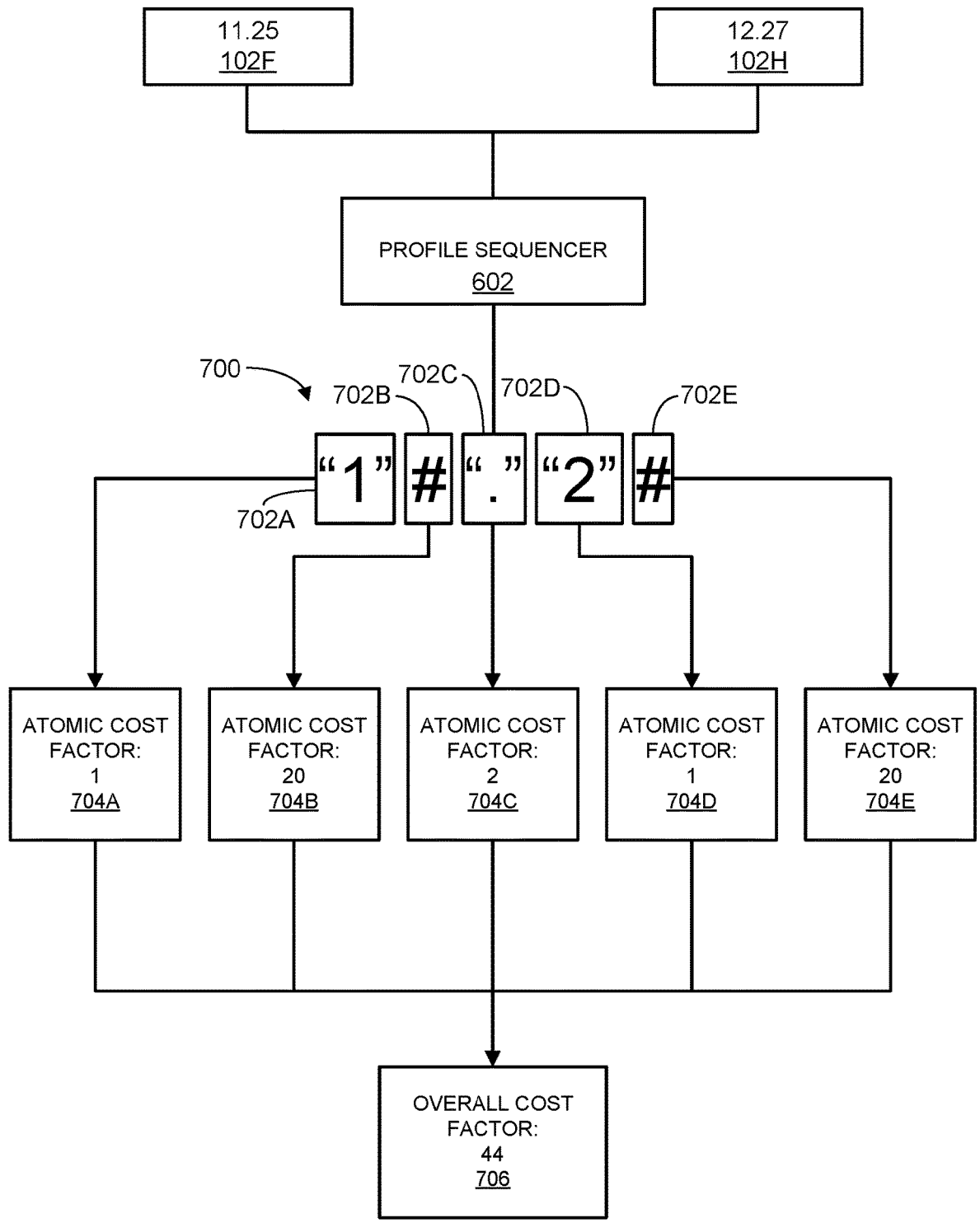
FIG. 7 schematically illustrates calculation of a cost factor of a syntactic profile based on atomic cost factors of the syntactic profile's profile atoms.

Cost factors will now be described in more detail with respect to FIG. 7, which schematically illustrates alphanumeric strings 102F and 102I1 of FIG. 1 being provided to profile sequencer 602 to produce an example profile 700. In FIG. 7, profile 700 is shown as a sequence of individual operators, or "profile atoms 702," including: "1" # "." "2" # (i.e., profile atoms 702A-702E). This indicates that the syntactic profile matches any alphanumeric strings that start with the digit 1, followed by another digit, followed by a period, followed by the digit 2, and followed by another digit. Both alphanumeric strings 102F ("11.25") and 102I1 ("12.27") match this profile. It will be understood that profile 700, as well as the specific notation used to represent profile 700, are presented as examples. Profiles may take any suitable form, describe any suitable alphanumeric strings having any formats, and be represented using any suitable notation.

The cost factor of a syntactic profile may in some cases be calculated based on the profile atoms that make up that syntactic profile. More specifically, each syntactic profile may comprise a plurality of profile atoms. Each profile atom may have its own atomic cost factor, and the cost factor of each syntactic profile may be calculated as a weighted sum of the atomic cost factors of the syntactic profile's profile atoms. This is shown in FIG. 7, in which each profile atom 702 has an associated atomic cost factor 704. The sum of each of the atomic cost factors is shown as overall cost factor 706, which describes the cost factor of syntactic profile 700. It will be understood that a cost factor may be represented with any suitable numerical value. In some implementations, lower numerical cost factor values may correspond to lower overall profile cost, while in other implementations, low-cost syntactic profiles may have high numerical cost factor values.

Atomic cost factors for profile atoms may be calculated in any suitable way. In some examples, the specific numerical values given to the profile atoms may be weighted so as to balance syntactic profile specificity against syntactic profile generality. In other words, general profile atoms may have relatively higher atomic cost factors than specific profile atoms. In this manner, overly general syntactic profiles, including one or more general profile atoms, are penalized. However, in some examples, even highly specific profile atoms will have a non-zero atomic cost factor, such that highly specific syntactic profiles with several specific profile atoms will have a higher overall cost factor than relatively less specific syntactic profiles with fewer overall profile atoms. In this manner, syntactic profiles are prioritized to achieve a compromise between overly general and overly specific syntactic profiles.

Returning briefly to FIG. 4, at 406, method 400 includes, based on the cost factors determined for the syntactic profiles of the candidate pairs, selecting one of the candidate pairs. In some examples, the syntactic profile for the selected candidate pair of multi-string clusters has a lower cost factor than syntactic profiles for other candidate pairs of multi-string clusters. In the example of FIG. 5, it may be determined that syntactic profile A, generated for the candidate pair of multi-string clusters 500A and 500B, has the lowest overall cost as compared to syntactic profiles B-H, generated for other candidate pairs of multi-string clusters. Accordingly, the candidate pair of multi-string clusters 500A and 500B may be selected.

Continuing with FIG. 4, at 408, method 400 includes combining the multi-string clusters from the selected candidate pair to generate a hierarchically-superior multi-string cluster. Strings in the generated hierarchically-superior multi-string cluster are therefore described by the syntactic profile identified as having the lowest overall cost, as described above. Combination of multi-string clusters is described above with respect to FIG. 3, in which a selected pair of multi-string clusters (i.e., multi-string clusters 300A and 300B) are combined via combination operation C1 to give hierarchically-superior multi-string cluster 300C, described by syntactic profile 306C.

In some implementations, the combination operation outlined above may be used a multitude of times to iteratively combine a plurality of clusters to produce hierarchically-superior clusters. In some implementations, the computing system may start with a plurality of single-string clusters (e.g., representing a subset of the alphanumeric strings in a dataset), and continue to iteratively combine clusters via the combination operation until all of the alphanumeric strings collectively contained within the initial set of clusters are contained within a single, hierarchically-paramount cluster. In this manner, the computing system may, for example, group every alphanumeric string from a dataset, or a subset of the dataset, into a cluster hierarchy, each cluster defined by a different syntactic profile. The nodes at any given cut in this hierarchy therefore define a set of syntactic patterns that describes all the different string formats present in the sampled data (e.g., the entire dataset or a subset of the dataset).

FIG. 8 schematically illustrates such a cluster hierarchy, constructed for the alphanumeric strings 102 shown in FIG. 1. Initially, each of the alphanumeric strings 102 are added to a different single-string cluster 800, shown as single-string clusters 800A-800I. Then, the combination operation outlined above begins, in which syntactic profiles are generated for candidate pairs of clusters, and clusters are iteratively combined based on the cost factors of the syntactic profiles to produce hierarchically-superior multi-string clusters. As indicated above, each candidate pair selected for combination may have a syntactic profile with a lowest overall cost as compared to syntactic profiles generated for other candidate pairs. In this manner, the first clusters to be combined are those that include the most similar alphanumeric strings, as indicated by the low cost of the syntactic profile that describes those strings.

In FIG. 8, some of the single-string clusters 800 are combined into second-level multi-string clusters 802. Further cluster combination eventually results in third-level multi-string clusters 804, a fourth-level multi-string cluster 806, a fifth-level multi-string cluster 808, and a hierarchically-paramount multi-string cluster 810. Each level in the hierarchy includes clusters holding more strings than the previous level, and such strings are described by a more general syntactic profile than strings from the previous level.

In FIG. 8, each of the multi-string clusters 802-810 also include the syntactic profile describing strings in those clusters. In the specific notation used herein, profile atoms taking the form of characters in quotation marks require the quoted character to be present in the string, at the specified position. The profile atom (TEXT) indicates that some sequence of alphabetic characters is present. The symbol "#" refers to a single digit, which must be present at the designated position. The symbol "*" indicates that any alphanumeric character, symbol, or punctuation mark is present at the designated position. The profile atom (+) with a second symbol present in the parentheses next to the plus sign, indicates that the specified second symbol or profile atom may or may not be present in strings described by the profile at the designated position. Finally, the equals sign in parentheses at the end of a profile indicates that some number of additional characters may or may not be present in strings that the profile describes. By examining the profiles in FIG. 8, it becomes clear that the most specific profiles are present at the lower levels of the hierarchy, while more general profiles are present at the top. The hierarchically-paramount multi-string cluster, including all of the alphanumeric strings 102, is defined by the profile "(=)," which simply describes the set of all strings in the dataset.

As indicated above, initial clustering and profiling may be done for a subset of strings sampled from a dataset, rather than the entire dataset itself. Accordingly, once clustering and cluster combination is complete, the computing system may compare additional alphanumeric strings from the dataset to the generated clusters, and add the additional strings to clusters that they fit into, based on the cluster-defining syntactic patterns. The strings that do not fit inside any cluster can be recursively clustered using the same algorithm. In other words, the computing system may add at least one additional alphanumeric string of the computer-maintained dataset to an existing cluster based on a syntactic profile describing the additional alphanumeric string and alphanumeric strings of the existing cluster. To use the example of FIG. 8, an additional alphanumeric string "12.25" would be described by the cluster-defining syntactic profile of second-level multi-string cluster 802C. Accordingly, the additional alphanumeric string could be added to this cluster, and an additional single-string cluster could be generated below cluster 802C holding the additional alphanumeric string. This process can continue until all alphanumeric strings in the dataset have been clustered and profiled.

Figure 9A:
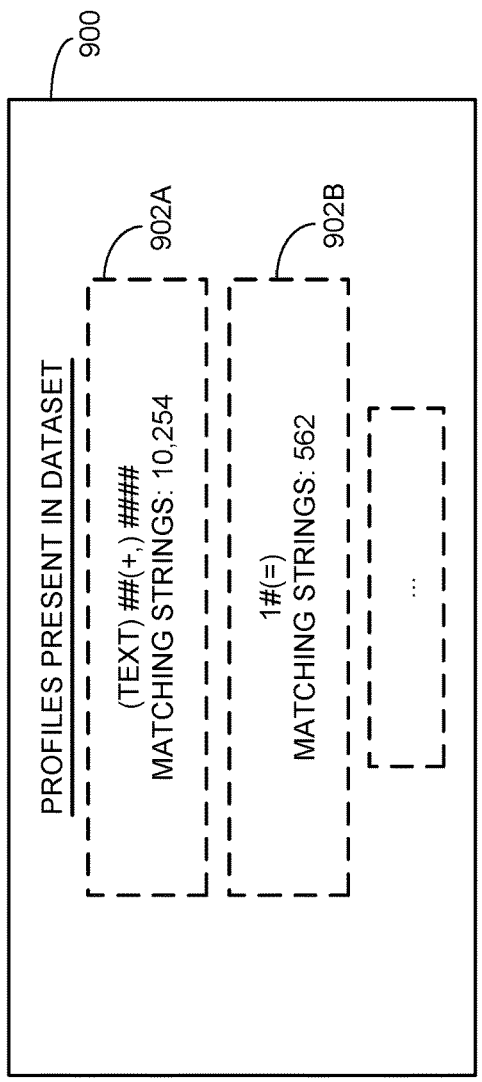
FIG. 9A depicts presentation of a first subset of syntactic profiles to a user.

Once alphanumeric strings from the dataset have been clustered and profiled, some or all of the cluster-defining syntactic profiles can be presented to a user in a user interface, along with an indication of how many alphanumeric strings in the computer-maintained dataset are described by each cluster-defining syntactic profile. This is illustrated in FIG. 9A, in which an example user interface 900 is shown. User interface 900 includes two cluster-defining profiles 902A and 902B, each including an indication of how many alphanumeric strings in the dataset are described by those profiles. Specifically, interface 900 indicates that profile 902A matches 10,254 strings in the dataset, while profile 902B indicates that 562 strings are present in the dataset.

Figure 9B:
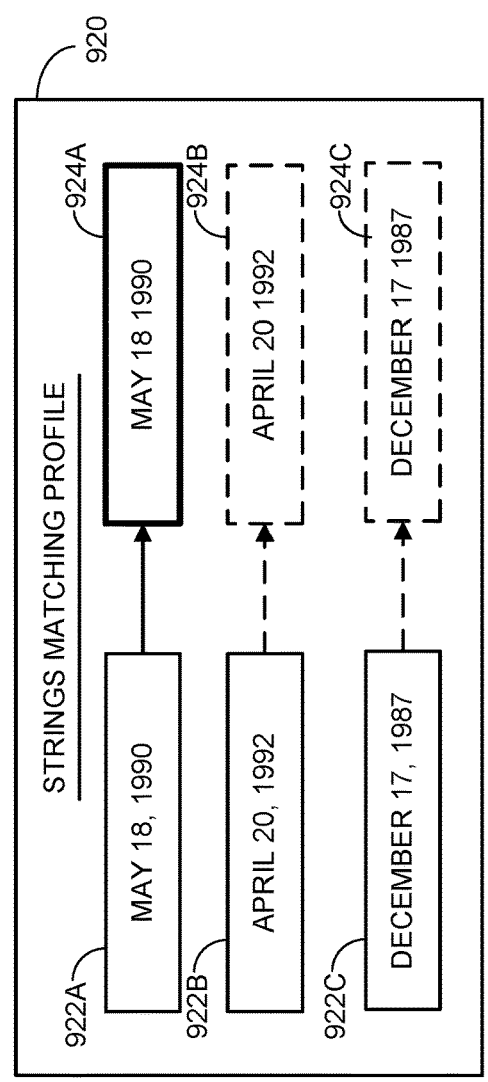
FIG. 9B depicts transformation of alphanumeric strings based on a desired transformation example provided by a user.

As indicated above, knowledge of which formats are represented in a dataset can facilitate the transformation of alphanumeric strings in the dataset to have a desired format. This is illustrated in FIG. 9B, which shows a different example user interface 920. Interface 920 includes three alphanumeric strings 922A-922C from a dataset, each matching a particular cluster-defining profile. In other words, each of these strings may have been grouped together into the same cluster during the clustering and profiling operations described above. Interface 920 also includes a desired transformation example 924A, which represents a user's desired transformation of alphanumeric string 922A. Based on this desired transformation, the computing system has synthesized a transformation program via programming-by-example (PBE), and applied it to alphanumeric strings 922B and 922C. This has resulted in a pair of transformed strings 924B and 924C, each having the user's desired format. This process can be repeated iteratively for each of the cluster-defining profiles, if desired.

Due to the hierarchical nature of the string clustering and profiling techniques described herein, alphanumeric strings will generally be described by more than one cluster-defining syntactic profile, as each alphanumeric string will generally be included in at least two clusters (i.e., a more specific cluster, and a more general, hierarchically-superior cluster). Accordingly, when syntactic profiles describing formats in the dataset are presented to a user, the presented syntactic profiles can include a subset of all the generated syntactic profiles, the subset having a desired specificity. Should the user desire to review syntactic profiles having a different specificity, the subset of cluster-defining syntactic profiles presented to the user can be updated. In other words, upon receiving a user input requesting a more or less specific subset of cluster-defining syntactic profiles, the computing system can present a second subset in lieu of the first subset, the second subset including more or less specific cluster-defining syntactic profiles (e.g., defining clusters present at different levels within the hierarchy).

Figure 9C:
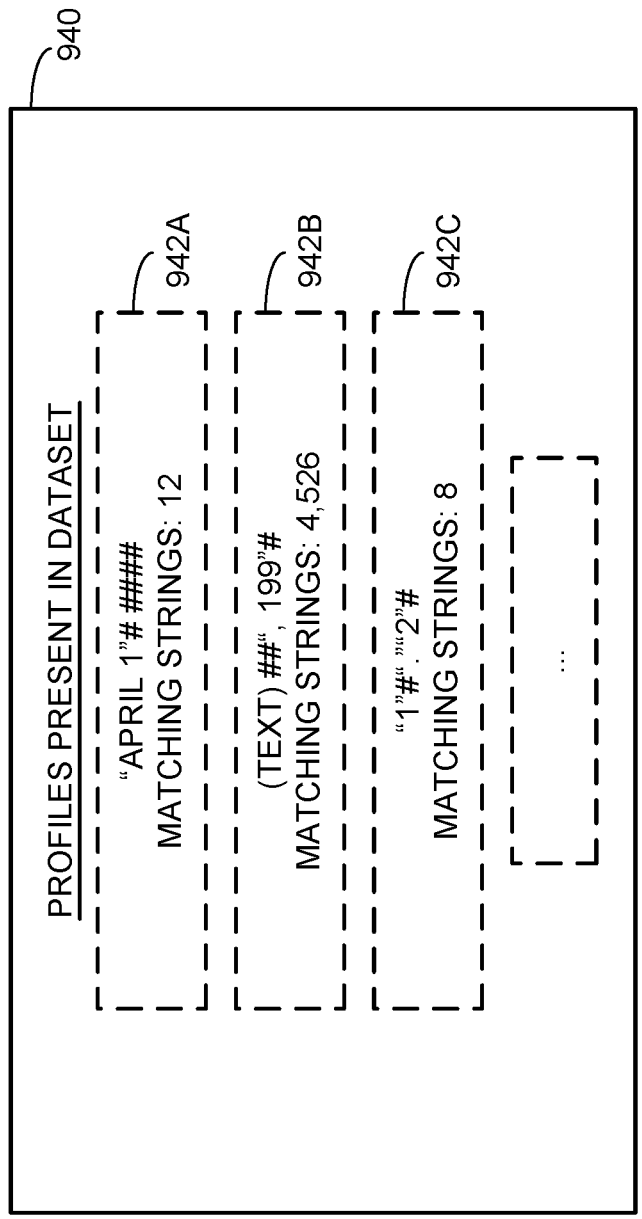
FIG. 9C depicts presentation of a second, more specific subset of syntactic profiles to a user.

This is indicated in FIG. 9C, which shows another example user interface 940. In FIG. 9C, a user has provided a user input requesting a more specific subset of cluster-defining profiles. Accordingly, user interface 940 includes a set of more specific profiles 942A-942C, each of which also includes an indicator of how many alphanumeric strings in the dataset match those more specific profiles.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
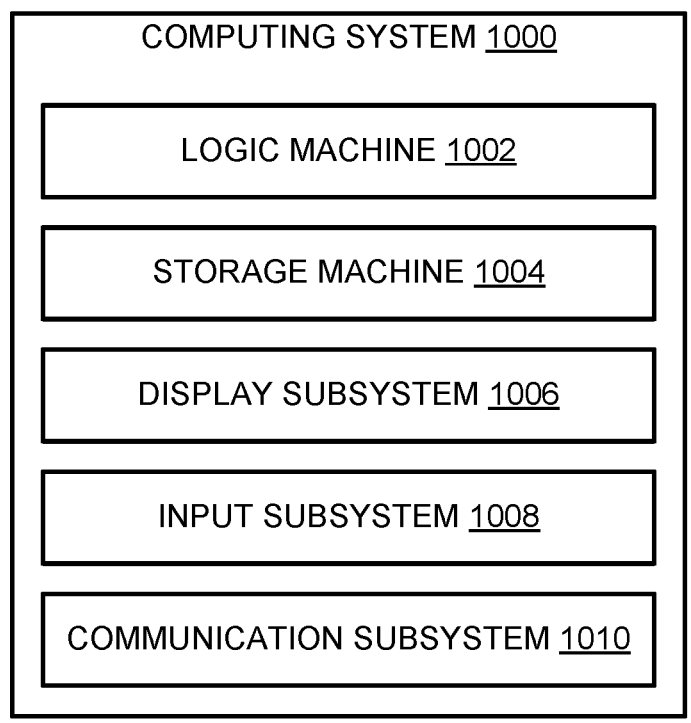
FIG. 10 schematically depicts an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally, or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

In an example, a computing device comprises: a logic machine; and a storage machine holding instructions executable by the logic machine to: generate a plurality of multi-string clusters, each of which contains a plurality of alphanumeric strings of a computer-maintained dataset; and generate further multi-string clusters via iteratively performing a combination operation in which a hierarchically-superior multi-string cluster is generated from a set of multi-string clusters, the combination operation including: for each of a plurality of candidate pairs of multi-string clusters from the set of multi-string clusters, generating a plurality of syntactic profiles, where each syntactic profile describes an alphanumeric string from one multi-string cluster of the candidate pair and an alphanumeric string from the other multi-string cluster of the candidate pair; for each of the plurality of candidate pairs of multi-string clusters, determining, for at least one of its syntactic profiles, a cost factor; based on the cost factors determined for the syntactic profiles of the candidate pairs, selecting one of the candidate pairs; and combining the multi-string clusters from the selected candidate pair to generate the hierarchically-superior multi-string cluster including all of the alphanumeric strings from the selected candidate pair of multi-string clusters. In this example or any other example, all of the alphanumeric strings contained in each generated cluster are described by a same syntactic profile, referred to for that generated cluster as a cluster-defining syntactic profile. In this example or any other example, the instructions are further executable to present a first subset of all of the cluster-defining syntactic profiles to a user in a user interface, along with an indication of how many alphanumeric strings in the computer-maintained dataset are described by each cluster-defining syntactic profile of the first subset. In this example or any other example, the instructions are further executable to, upon receiving a user input requesting a more specific subset of cluster-defining syntactic profiles, present a second subset of all of the cluster-defining syntactic profiles in lieu of the first subset, the second subset including more specific cluster-defining syntactic profiles. In this example or any other example, the instructions are further executable to receive from the user a desired transformation example for at least one alphanumeric string described by a particular cluster-defining syntactic profile of the first subset, and generate a transformation program to transform at least some of the alphanumeric strings described by the particular cluster-defining syntactic profile based on the desired transformation example. In this example or any other example, the plurality of syntactic profiles is generated by a profile synthesizer parameterized with a domain-specific language (DSL). In this example or any other example, the generation of syntactic profiles includes providing two or more alphanumeric strings to the profile synthesizer and receiving from the profile sequencer the plurality of syntactic profiles describing the two or more alphanumeric strings. In this example or any other example, each syntactic profile comprises a plurality of profile atoms, each profile atom having an atomic cost factor, and the cost factor of each syntactic profile is a weighted sum of the atomic cost factors of the syntactic profile's profile atoms. In this example or any other example, more general profile atoms have higher atomic cost factors. In this example or any other example, the syntactic profile for the selected candidate pair of multi-string clusters has a lower cost factor than syntactic profiles for other candidate pairs of multi-string clusters. In this example or any other example, the plurality of multi-string clusters is generated by performing the combination operation to iteratively combine a plurality of single-string clusters. In this example or any other example, the plurality of multi-string clusters collectively includes a subset of the alphanumeric strings of the computer-maintained dataset. In this example or any other example, the subset of alphanumeric strings is randomly sampled from the computer-maintained dataset. In this example or any other example, the instructions are further executable to add at least one additional alphanumeric string of the computer-maintained dataset to an existing cluster based on a syntactic profile describing the additional alphanumeric string and alphanumeric strings of the existing cluster. In this example or any other example, the instructions are further executable to continue to iteratively combine clusters via the combination operation until all of the alphanumeric strings collectively contained within the plurality of multi-string clusters are contained within a single hierarchically-paramount cluster.

In an example, a computer-implemented method for syntactic profiling of alphanumeric strings in a computer-maintained dataset comprises: generating a plurality of multi-string clusters, each of which contains a plurality of the alphanumeric strings of the computer-maintained dataset; and generating further multi-string clusters via iteratively performing a combination operation in which a hierarchically-superior multi-string cluster is generated from a set of multi-string clusters, the combination operation including: for each of a plurality of candidate pairs of multi-string clusters from the set of multi-string clusters, generating a plurality of syntactic profiles, where each syntactic profile describes an alphanumeric string from one multi-string cluster of the candidate pair and an alphanumeric string from the other multi-string cluster of the candidate pair; for each of the plurality of candidate pairs of multi-string clusters, determining, for at least one of its syntactic profiles, a cost factor; based on the cost factors determined for the syntactic profiles of the candidate pairs, selecting one of the candidate pairs; and combining the multi-string clusters from the selected candidate pair to generate the hierarchically-superior multi-string cluster including all of the alphanumeric strings from the selected candidate pair of multi-string clusters. In this example or any other example, all of the alphanumeric strings contained in each generated cluster are described by a same syntactic profile, referred to for that generated cluster as a cluster-defining syntactic profile, and the method further comprises presenting a first subset of all of the cluster-defining syntactic profiles to a user in a user interface, along with an indication of how many alphanumeric strings in the computer-maintained dataset are described by each cluster-defining syntactic profile of the first subset. In this example or any other example, the plurality of multi-string clusters collectively includes a subset of alphanumeric strings sampled from the computer-maintained dataset, and the method further comprises adding at least one additional alphanumeric string of the computer-maintained dataset to an existing cluster based on a syntactic profile describing the additional alphanumeric string and alphanumeric strings of the existing cluster. In this example or any other example, the method further comprises continuing to iteratively combine clusters via the combination operation until all of the alphanumeric strings collectively contained within the plurality of multi-string clusters are contained within a single hierarchically-paramount cluster.

In an example, a computing device comprises: a logic machine; and a storage machine holding instructions executable by the logic machine to: from a plurality of single-string clusters, generate a plurality of multi-string clusters via a combination operation, each of the single-string clusters containing a different alphanumeric string of a subset of alphanumeric strings sampled from a computer-maintained dataset; and through iteratively repeated combining of clusters via the combination operation, generate a hierarchically-paramount cluster containing all alphanumeric strings of the subset, where the combination operation includes: for each of a plurality of candidate pairs of clusters, generating a plurality of syntactic profiles, where each syntactic profile describes an alphanumeric string from one cluster of the candidate pair and an alphanumeric string from the other cluster of the candidate pair; for each of the plurality of candidate pairs of clusters, determining cost factors for each of its syntactic profiles; based on the cost factors determined for the syntactic profiles of the candidate pairs, selecting one of the candidate pairs; and combining the clusters from the selected candidate pair to generate a hierarchically-superior cluster including all of the alphanumeric strings from the selected candidate pair of clusters.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic machine; and
a storage machine holding instructions executable by the logic machine to:
generate a plurality of multi-string clusters, each multi-string cluster including a plurality of alphanumeric strings of a computer-maintained dataset; and
generate further multi-string clusters by iteratively performing a combination operation in which a hierarchically-superior multi-string cluster is generated from a set of multi-string clusters, the combination operation including:
for a candidate pair of multi-string clusters, identifying a syntactic profile describing each alphanumeric string included in the multi-string clusters of the candidate pair; and
combining the multi-string clusters from the candidate pair to generate the hierarchically-superior multi-string cluster including all of the alphanumeric strings from the candidate pair of multi-string clusters.

2. The computing device of claim 1, where the syntactic profile is generated as one of a plurality of different syntactic profiles, such that one or more syntactic profiles are generated for each of a plurality of candidate pairs of multi-string clusters.

3. The computing device of claim 2, where the combination operation further includes determining a cost factor for at least one of the one or more syntactic profiles generated for each of the plurality of candidate pairs.

4. The computing device of claim 3, where each syntactic profile comprises a plurality of profile atoms, each profile atom having an atomic cost factor, and where the cost factor of each syntactic profile is a weighted sum of the atomic cost factors of the syntactic profile's profile atoms.

5. The computing device of claim 4, where more general profile atoms have higher atomic cost factors.

6. The computing device of claim 3, where the multi-string clusters of the candidate pair combined into the hierarchically-superior multi-string cluster are selected based on the cost factor associated with a syntactic profile of the candidate pair.

7. The computing device of claim 6, where the syntactic profile describing the multi-string clusters combined into the hierarchically-superior multi-string cluster has a lower cost factor than syntactic profiles for other candidate pairs of multi-string clusters.

8. The computing device of claim 2, where all of the alphanumeric strings included in each generated cluster are described by a same syntactic profile, referred to for that generated cluster as a cluster-defining syntactic profile, and where the instructions are further executable to present a first subset of all of the cluster-defining syntactic profiles in a user interface, along with an indication of how many alphanumeric strings in the computer-maintained dataset are described by each cluster-defining syntactic profile of the first subset.

9. The computing device of claim 8, where the instructions are further executable to, upon receiving a request for a more specific subset of cluster-defining syntactic profiles, present a second subset of all of the cluster-defining syntactic profiles in lieu of the first subset, the second subset including more specific cluster-defining syntactic profiles.

10. The computing device of claim 2, where the plurality of syntactic profiles is generated by a profile synthesizer parameterized with a domain-specific language (DSL).

11. The computing device of claim 1, where the plurality of multi-string clusters is generated by performing the combination operation to iteratively combine a plurality of single-string clusters.

12. The computing device of claim 1, where the plurality of multi-string clusters collectively includes a subset of the alphanumeric strings of the computer-maintained dataset.

13. The computing device of claim 12, where the subset of alphanumeric strings is randomly sampled from the computer-maintained dataset.

14. The computing device of claim 12, where the instructions are further executable to add at least one additional alphanumeric string of the computer-maintained dataset to an existing cluster based on a same syntactic profile describing both the additional alphanumeric string and alphanumeric strings of the existing cluster.

15. The computing device of claim 1, where the instructions are further executable to continue to iteratively combine clusters via the combination operation until all of the alphanumeric strings collectively included within the plurality of multi-string clusters are included within a single hierarchically-paramount cluster.

16. A computer-implemented method for syntactic profiling of alphanumeric strings in a computer-maintained dataset, comprising:
   generating a plurality of multi-string clusters, each multi-string cluster including a plurality of the alphanumeric strings of the computer-maintained dataset; and
   generating further multi-string clusters by iteratively performing a combination operation in which a hierarchically-superior multi-string cluster is generated from a set of multi-string clusters, the combination operation including:
      for a candidate pair of multi-string clusters, identifying a syntactic profile describing each alphanumeric string included in the multi-string clusters of the candidate pair; and
      combining the multi-string clusters from the candidate pair to generate the hierarchically-superior multi-string cluster including all of the alphanumeric strings from the candidate pair of multi-string clusters.

17. The computer-implemented method of claim 16, where all of the alphanumeric strings included in each generated cluster are described by a same syntactic profile, referred to for that generated cluster as a cluster-defining syntactic profile, and where the method further comprises presenting a first subset of all of the cluster-defining syntactic profiles in a user interface, along with an indication of how many alphanumeric strings in the computer-maintained dataset are described by each cluster-defining syntactic profile of the first subset.

18. The computer-implemented method of claim 16, where the plurality of multi-string clusters collectively includes a subset of alphanumeric strings sampled from the computer-maintained dataset, and the method further comprises adding at least one additional alphanumeric string of the computer-maintained dataset to an existing cluster based on a syntactic profile describing the additional alphanumeric string and alphanumeric strings of the existing cluster.

19. The computer-implemented method of claim 16, further comprising continuing to iteratively combine clusters via the combination operation until all of the alphanumeric strings collectively included within the plurality of multi-string clusters are included within a single hierarchically-paramount cluster.

20. A computing device, comprising:
   a logic machine; and
   a storage machine holding instructions executable by the logic machine to:
      from a plurality of single-string clusters, generate a plurality of multi-string clusters via a combination operation, each of the single-string clusters including a different alphanumeric string of a subset of alphanumeric strings sampled from a computer-maintained dataset; and
      through iteratively repeated combining of clusters via the combination operation, generate a hierarchically-paramount cluster containing all alphanumeric strings of the subset,
      where the combination operation includes:
         for a candidate pair of clusters, identifying a syntactic profile describing each alphanumeric string included in the clusters of the candidate pair; and
         combining the clusters from the candidate pair to generate a hierarchically-superior cluster including all of the alphanumeric strings from the candidate pair of clusters.

* * * * *